(12) United States Patent
Kim et al.

(10) Patent No.: US 9,114,387 B2
(45) Date of Patent: Aug. 25, 2015

(54) METHOD OF PREPARING MULTICOMPONENT METAL-HYBRID CO-GASIFICATION, AND MULTICOMPONENT METAL-HYBRID NANOCOMPOSITE PREPARED THEREBY

(71) Applicant: Korea Institute of Energy Research, Daejeon (KR)

(72) Inventors: Hee-Yeon Kim, Daejeon (KR); Seok-yong Hong, Daejeon (KR); Kwang-Sup Song, Daejeon (KR); Hong-Soo Kim, Daejeon (KR)

(73) Assignee: KOREA INSTITUTE OF ENERGY RESEARCH (KR)

( * ) Notice: Subject to any disclaimer, the term of this patent is extended or adjusted under 35 U.S.C. 154(b) by 93 days.

(21) Appl. No.: 13/944,029

(22) Filed: Jul. 17, 2013

(65) Prior Publication Data

US 2014/0057779 A1    Feb. 27, 2014

(30) Foreign Application Priority Data

Aug. 23, 2012    (KR) .................. 10-2012-0092229

(51) Int. Cl.
*B01J 23/00*   (2006.01)
*B01J 12/00*   (2006.01)
(Continued)

(52) U.S. Cl.
CPC .............. *B01J 23/892* (2013.01); *B01J 21/18* (2013.01); *B01J 23/63* (2013.01); *B01J 23/6525* (2013.01);
(Continued)

(58) Field of Classification Search
CPC ............ B01J 23/00; B01J 12/00; B01J 23/28; B01J 23/30; B01J 23/44; B01J 23/6525; B01J 23/6527; B01J 23/755; B01J 23/883; B01J 23/8871; B01J 23/8885; B01J 23/892; B01J 23/894; B05D 5/12; B05D 3/02; C23C 14/00
USPC .......... 502/304, 305, 313, 315, 321; 427/115, 427/122–125, 226, 228, 248.1, 249.1, 250, 427/255.11, 255.23, 255.26, 372.2
See application file for complete search history.

(56) References Cited

U.S. PATENT DOCUMENTS 4,482,641 A * 11/1984 Wennerberg .................. 502/182
5,318,797 A *  6/1994 Matijevic et al. ........ 427/213.31
(Continued)

FOREIGN PATENT DOCUMENTS

CN            101233266 A      7/2008
KR     1020010062849 A       7/2001
(Continued)

OTHER PUBLICATIONS

Chinese Office Action, Application No. CN201310327276.6, Apr. 3, 2015, 6 pages.

*Primary Examiner* — Patricia L Hailey
(74) *Attorney, Agent, or Firm* — Mark E. Bandy; Rankin, Hill & Clark LLP

(57) ABSTRACT

The present subject matter provides a method of preparing a multicomponent metal-hybrid nanocomposite using co-gasification, in which a multicomponent metal-hybrid nanocomposite can be prepared by a one-step process without using a complicated process including the steps of supporting-drying-calcining-annealing and the like at the time of preparing a conventional alloy catalyst, and provides a multicomponent metal-hybrid nanocomposite prepared by the method. The method is advantageous in that a multicomponent metal-hybrid nanocomposite can be synthesized by a simple process of simultaneously gasifying two kinds of metal precursors, and in that an additional post-treatment process is not required.

19 Claims, 2 Drawing Sheets

(51) Int. Cl.

| | |
|---|---|
| *B01J 23/28* | (2006.01) |
| *B01J 23/30* | (2006.01) |
| *B01J 23/44* | (2006.01) |
| *B05D 3/02* | (2006.01) |
| *B05D 5/12* | (2006.01) |
| *C23C 14/00* | (2006.01) |
| *B01J 23/89* | (2006.01) |
| *B01J 37/03* | (2006.01) |
| *B01J 37/08* | (2006.01) |
| *B01J 21/18* | (2006.01) |
| *B01J 23/63* | (2006.01) |
| *B01J 23/652* | (2006.01) |
| *B01J 23/83* | (2006.01) |
| *B01J 23/883* | (2006.01) |
| *B01J 23/888* | (2006.01) |
| *B01J 35/00* | (2006.01) |
| *B82Y 30/00* | (2011.01) |

(52) U.S. Cl.
CPC .............. *B01J 23/6527* (2013.01); *B01J 23/83* (2013.01); *B01J 23/883* (2013.01); *B01J 23/888* (2013.01); *B01J 35/002* (2013.01); *B01J 37/035* (2013.01); *B01J 37/08* (2013.01); *B01J 37/086* (2013.01); *B82Y 30/00* (2013.01)

(56) References Cited

U.S. PATENT DOCUMENTS

| | | | | |
|---|---|---|---|---|
| 5,876,503 | A | * | 3/1999 | Roeder et al. ................. 118/715 |
| 6,103,393 | A | * | 8/2000 | Kodas et al. .................. 428/570 |
| 6,635,348 | B1 | * | 10/2003 | Hampden-Smith et al. .. 428/402 |
| 6,660,680 | B1 | * | 12/2003 | Hampden-Smith et al. .. 502/180 |
| 6,906,000 | B1 | * | 6/2005 | Ganguli et al. ............... 502/180 |
| 6,967,183 | B2 | * | 11/2005 | Hampden-Smith et al. .. 502/101 |
| 7,053,021 | B1 | * | 5/2006 | Zhong et al. .................. 502/185 |
| 7,935,655 | B2 | * | 5/2011 | Tolmachev .................... 502/326 |
| 8,648,004 | B2 | * | 2/2014 | Kuo et al. ...................... 502/184 |
| 2005/0079349 | A1 | * | 4/2005 | Hampden-Smith et al. .. 428/402 |
| 2013/0273246 | A1 | * | 10/2013 | Chisholm et al. ............. 427/212 |
| 2014/0087939 | A1 | * | 3/2014 | Kim et al. ..................... 502/185 |

FOREIGN PATENT DOCUMENTS

| | | | |
|---|---|---|---|
| KR | 1020020032935 A | 4/2002 | |
| KR | 1020040091796 A | 2/2004 | |
| KR | 10-0573295 | * 11/2004 | ............... B82B 3/00 |

* cited by examiner

… (1) …

METHOD OF PREPARING MULTICOMPONENT METAL-HYBRID CO-GASIFICATION, AND MULTICOMPONENT METAL-HYBRID NANOCOMPOSITE PREPARED THEREBY

CROSS-REFERENCE TO RELATED APPLICATIONS

This application claims the benefit of Korean Patent Application No. 10-2012-0092229, filed with the Korean Intellectual Property Office on Aug. 23, 2012, the disclosure of which is incorporated herein by reference in its entirety.

BACKGROUND

1. Technical Field

The present subject matter relates to a method of synthesizing multicomponent metal-hybrid nanocomposite by a simple one-step process. More particularly, the present subject matter relates to a method of preparing a multicomponent metal-hybrid nanocomposite using co-gasification, in which a multicomponent metal-hybrid nanocomposite can be prepared by a one-step process without using a complicated process including the steps of supporting-drying-calcining-annealing and the like at the time of preparing a conventional alloy catalyst, and to a multicomponent metal-hybrid nanocomposite prepared by the method.

2. Description of the Related Art

Recently, in the field of research into catalysts, 1) technologies for synthesizing a porous support having a large surface area and strong physical/chemical durability and 2) technologies for nanosizing and highly-dispersing a catalytic metal to solve the problem of a catalyst preparation cost being increased due to the increase of a metal price have attracted considerable attention. In addition, 3) technologies for effectively adding a co-catalyst to improve reaction activity of a main catalyst have been researched, and 4) technologies for improving the interaction between a metal and a support to prevent the metal nanoparticles prepared in an initial highly-dispersive state from being agglomerated or detached according to the progress of a high-temperature catalytic reaction thus to prevent the activity of a catalyst from being deteriorated have been researched. There are several reasons for adding a co-catalyst. Typically, a co-catalyst is added in order to control the adsorption site of a metal used as a main catalyst, smoothly transfer a reaction gas such as oxygen, hydrogen or the like to reactants or enhance the interaction between a metal catalyst and a support. Generally, a co-catalyst is added using an incipient wetting method or a wet impregnation method, wherein a main catalyst is first supported and then a co-catalyst is supported. A multicomponent metal catalyst using two or more kinds of catalysts generally passes through an alloy process of heat-treating it at a high temperature of 800° C. or more. Meanwhile, when an incipient wetting method or a wet impregnation method is used, there is a problem in that it is difficult to obtain highly-dispersed nano-sized catalyst particles because metal particles are easily agglomerated.

SUMMARY

Accordingly, the present subject matter has been devised to solve the above-mentioned problems, and an object of the present subject matter is to provide a method of preparing a multicomponent metal-hybrid nanocomposite using a one-step process, wherein various metal precursors are simultaneously gasified to form gaseous metal precursors, and nano-sized metal-metal composites are synthesized between the gaseous metal precursors. That is, the present subject matter intends to develop a method of effectively preparing a nano-sized hybrid metal composite using a one-step process without conducting a complicated process including several steps.

Another object of the present subject matter is to provide a method preparing a multicomponent metal-hybrid nanocomposite supported on a high performance/high durability support, which can be effectively used in a co-gasification process because variables do not occur according to scale-up, and which can be effectively used in most catalytic processes using a conventional heterogeneous catalyst because a support is made of a carbon material selected from various carbon materials and a ceramic material selected from various ceramic materials, such as alumina, silica, zeolite, zirconia, titania and the like, and provides a multicomponent metal-hybrid nanocomposite prepared by the method.

In order to accomplish the above objects, an aspect of the present subject matter provides a method of preparing a multicomponent metal-hybrid nanocomposite, including the steps of: (S1) providing a first metal precursor and a second metal precursor which were gasified by their respective gasifiers; (S2) supplying the gasified first and second metal precursors to a reactor in a noncontact state; and (S3) heating the reactor and then maintaining the temperature of the reactor constant to synthesize a multicomponent metal-hybrid nanocomposite.

Another aspect of the present subject matter provides a multicomponent metal-hybrid nanocomposite prepared by the method.

Still another aspect of the present subject matter provides a method of preparing a multicomponent metal-hybrid nanocomposite, including the steps of: (S1) disposing a support in a reactor; (S2) providing a first metal precursor and a second metal precursor which were gasified by their respective gasifiers; (S3) supplying the gasified first and second metal precursors to the reactor in a noncontact state; and (S4) heating the reactor and then maintaining the temperature of the reactor constant to synthesize a multicomponent metal-hybrid nanocomposite supported on the support.

Still another aspect of the present subject matter provides a multicomponent metal-hybrid nanocomposite supported on a support, prepared by the method.

BRIEF DESCRIPTION OF THE DRAWINGS

The above and other objects, features and advantages of the present subject matter will be more clearly understood from the following detailed description taken in conjunction with the accompanying drawings, in which.

DESCRIPTION OF THE EMBODIMENTS

Figure 1:
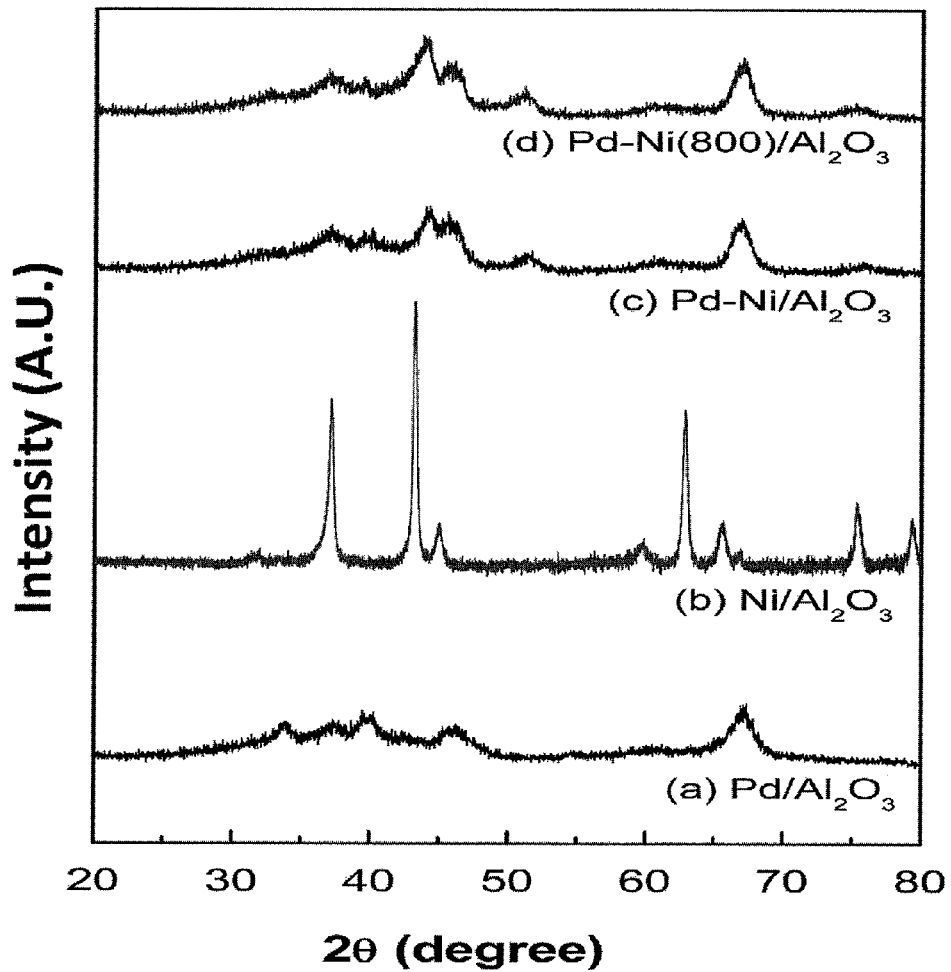
FIG. 1 is a graph showing the XRD analysis results of nickel-palladium nanocomposites prepared in Example 1 and Comparative Example 1.

Hereinafter, the present subject matter will be described in detail.

According to an embodiment of the present subject matter, a multicomponent metal-hybrid nanocomposite can be prepared in the form of powder using a co-gasification process. Specifically, a method of preparing a multicomponent metal-hybrid nanocomposite according to an embodiment of the present subject matter includes the steps of: (S1) providing a first metal precursor and a second metal precursor which were gasified by their respective gasifiers; (S2) supplying the gasified first and second metal precursors to a reactor in a noncontact state; and (S3) heating the reactor and then maintaining the temperature of the reactor constant to synthesize a multicomponent metal-hybrid nanocomposite.

First, a first metal precursor and a second metal precursor, which were gasified by their respective gasifiers, are provided (S1).

In this step, the first metal precursor is supplied to one gasifier, the second metal precursor is supplied to another gasifier, and then each of the gasifiers is heated to the boiling point of each of the precursors, thus simultaneously gasifying the first and second metal precursors.

The first metal precursor and the second metal precursor used in this step are different from each other, and all gasifiable materials can be used as the first and second metal precursors. Preferably, any one selected from the group consisting of a nickel precursor, a molybdenum precursor, a palladium precursor, a cerium precursor and a tungsten precursor may be used as each of the first metal precursor and the second metal precursor. More preferably, the nickel precursor may be nickel(II) acetylacetonate, bis-cyclopentadienyl nickel or tetrakis-trifluorophosphine nickel. The molybdenum precursor may be molybdenum hexacarbonyl or molybdenum(V) chloride. The palladium precursor may be selected from the group consisting of palladium(II) acetate, palladium (II) hexafluoroacetylacetonate, and palladium(II) acetylacetonate. The cerium precursor may be selected from the group consisting of tetrakis(2,2,6,6-tetramethyl-3,5-heptadionate) cerium(IV), cerium nitrate, cerium dipivaloylmethanate, and cerium(III) chloride. The tungsten precursor may be tungsten hexacarbonyl or tungsten(IV) chloride. These metal precursors are required to be suitably adjusted because their gas phase conditions and gasification temperatures are different from each other.

The gasifier used in this step may be a commonly-known gasifier or a directly-made gasifier. Generally, the gasifier may be made of a metal material or a glass material (quartz glass or Pyrex glass). It is advantageous that the gasifier be made of a glass material because the glass material is a stable material by which the state and residual quantity of contents in the gasifier can be observed at a constant temperature and which does not react with a precursor.

The first and second metal precursors used in this step may be liquid, gaseous and solid precursors.

According to an embodiment of the present subject matter, when nickelocene is used as the nickel precursor, it can be gasified at a temperature of 250° C. or more, and when nickel carbonyl is used as the nickel precursor, it can be gasified at room temperature. When palladium acetate is used as the palladium precursor, it can be gasified at a temperature of from about 100 to about 150° C. while it is transferred to the reactor by a proportioning pump with it being dissolved in an organic solvent such as acetone, benzene or the like.

Subsequently, the first metal precursor and second metal precursors gasified in the step S1 are supplied to a reactor in a noncontact state (S2).

In this step, each of the first and second metal precursors is contactlessly supplied to the reactor in a noncontact state, for example, is supplied to the reactor through an additional supply line. Therefore, the gasified precursors are joined with each other at the inlet of the reactor. Meanwhile, when the gasified precursors are joined with each other in a transfer pathway, there is a problem in that undesired side reactions take place or the wall of the transfer pathway is coated with these gasified precursors.

Preferably, in this step, gaseous precursors can be supplied to the reactor by a carrier gas. The carrier gas serves to transfer these gaseous precursors to the reactor while preventing the condensation of the gaseous precursors and preventing side reactions. As the carrier gas, oxygen, hydrogen, nitrogen, argon or helium gas may be used. Preferably, an inert gas such as nitrogen, argon or helium may be used as the carrier gas, and, if necessary, oxygen or hydrogen may be used as the carrier gas according to the kind of precursors.

In this step, the composition of a finally-produced composite can be controlled by adjusting the flow ratio of the precursors supplied to the reactor. For example, when the flow ratio of the first metal precursor to the second metal precursor is 2:1, the weight ratio (wt %) of a first metal in the finally-produced composite increases compared to when the flow ratio thereof is 1:1. Therefore, the flow ratio of the precursors is changed according to the applied catalytic reaction and the targeted metal combination ratio, thus synthesizing various types of multicomponent metal-hybrid nanocomposites.

Finally, the reactor, to which the gasified first and second metal precursors were supplied in the step S2, is heated, and then the temperature of the reactor is maintained constant to prepare a multicomponent metal-hybrid nanocomposite in the form of powder (S3). In this step, the reaction condition for synthesizing the multicomponent metal-hybrid nanocomposite depends on the kind of each metal precursor. Generally, the synthesis reaction of the multicomponent metal-hybrid nanocomposite easily proceeds at a synthesis temperature of from about 600 to about 1100° C., and the synthesis temperature may be selected by the design of a suitable heater and reactor. In this synthesis temperature range, as the synthesis temperature decreases, nanoparticles are easily synthesized, and as the synthesis temperature increases according to the kind of metal, the size of particles somewhat increases. In the synthesis reaction, synthesis time may be 5 minutes or more, and preferably about 1 hour. It is obvious that, as synthesis time increases, the amount of the synthesized metal-hybrid nanocomposite increases.

The present subject matter provides a multicomponent metal-hybrid nanocomposite prepared by the method of the present subject matter. The multicomponent metal-hybrid nanocomposite is prepared in the form of powder composed of nanoparticles, and the diameter of the nanoparticles is about 0.5 to about 20 nm.

According to another embodiment of the present subject matter, a multicomponent metal-hybrid nanocomposite can be prepared in the form of being supported on a support using a co-gasification process and a support. Specifically, a method of preparing a multicomponent metal-hybrid nanocomposite according to another embodiment of the present subject matter includes the steps of: (S1) disposing a support in a reactor; (S2) providing a first metal precursor and a second metal precursor which were gasified by their respective gasifiers; (S3) supplying the gasified first and second metal precursors to the reactor in a noncontact state; and (S4) heating the reactor and then maintaining the temperature of the reactor constant to synthesize a multicomponent metal-hybrid nanocomposite supported on the support.

The support used in the present subject matter is not particularly limited, but may be selected from the group consisting of carbon materials such as carbon paper, active carbon and carbon black; alumina materials such as alumina powder and a alumina sheet; silica powder; titania powder; zirconia powder; various kinds of zeolites; and metal foils such as nickel foil and aluminum foil. Preferably, when a support having a large surface area is used as the support, a supporting effect can be maximized. Therefore, multicomponent metal-hybrid nanocomposites are synthesized on the surface of a support having a large surface area, such as carbon powder, alumina powder or zeolite powder, and are then applied to various kinds of catalytic reactions such as reforming, thermal cracking, hydrogenation/dehydrogenation and the like.

This embodiment is different from the above-mentioned embodiment in that a support is previously disposed in a reactor, a composite is synthesized on the support, and thus a final product is a multicomponent metal-hybrid nanocomposite supported on the support. Detailed constitutions used in the steps of S2 to S4 were afore-mentioned.

The present subject matter provides a multicomponent metal-hybrid nanocomposite supported on a support, prepared by the method. The multicomponent metal-hybrid nanocomposite supported on a support is advantageous in that a catalyst is easily recovered after it is supported on the support and then used in a catalytic reaction, in that it can be usefully used when a catalytic reaction proceeds in a conventional monolithic reactor, honeycomb reactor, microchannel reactor, membrane reactor, fixed-bed reactor or the like, and in that it can be applied to various kinds of adsorbing-desorbing processes because it can be supported on a conventional adsorbent.

Hereinafter, the present subject matter will be described in more detail with reference to the following Examples. These Examples are set forth to illustrate the present subject matter, and the scope of the present subject matter is not limited thereto.

Example 1

Preparation of Nickel-Palladium Nanocomposite Supported on Alumina

Nickel carbonyl ($Ni(CO)_4$), which is a nickel precursor, was used as a first metal precursor, and palladium acetate ($Pd(O_2CCH_3)_2$), which is a palladium precursor, was used as a second metal precursor.

A Pyrex gasifier blocked from the air was installed in an isothermal oven, and then a liquid nickel precursor was put into the oven using a gas-tight syringe. Subsequently, a carrier gas (nitrogen, 10 sccm) was flowed into the oven while maintaining the temperature of the oven at 35° C. to form a gaseous nickel precursor, and the gaseous nickel precursor was transferred to a reactor. Simultaneously with this procedure, a palladium precursor dissolved in benzene was transferred to the reactor using a proportioning pump, and, at this time, a tube, through which a palladium-benzene solution (5 wt % of palladium) is transferred, was wound with a heating line to increase the temperature of the tube to 120° C., thus preventing the palladium precursor from being precipitated during movement and injecting the gasified palladium precursor into the reactor using vapor pressure as soon as the mixed solution reached the reactor. The flow rate of the proportional pump was set 0.05 mL/min. The time at which two kinds of precursors gasified by their respective pathways meet with each other in a quartz reactor for synthesizing a metal nanocomposite was defined by synthesis starting time. Meanwhile, alumina powder previously dried at 110° C. for 12 hours was disposed in the quartz reactor, and then the gaseous precursors were flowed thereinto. The synthesis temperature was maintained at 700° C. for 1 hour to prepare a nickel-palladium nanocomposite supported on alumina.

Example 2

Preparation of Nickel-Palladium Nanocomposite Supported on Carbon Powder

A nickel-palladium nanocomposite was prepared in the same manner as in Example 1, except that carbon black previously dried at 110° C. for 12 hours was disposed in a quartz reactor for synthesizing a nickel-palladium nanocomposite.

Example 3

Preparation of Nickel-Palladium Nanocomposite

Nickel carbonyl ($Ni(CO)_4$), which is a nickel precursor, was used as a first metal precursor, and palladium acetate ($Pd(O_2CCH_3)_2$), which is a palladium precursor, was used as a second metal precursor.

A Pyrex gasifier blocked from the air was installed in an isothermal oven, and then a liquid nickel precursor was put into the oven using a gas-tight syringe. Subsequently, a carrier gas (nitrogen, 30 sccm) was flowed into the oven while maintaining the temperature of the oven at 35° C. to form a gaseous nickel precursor, and the gaseous nickel precursor was transferred to a reactor. Simultaneously with this procedure, a palladium precursor dissolved in benzene was transferred to the reactor using a proportioning pump. Here, the time at which the two kinds of precursors meet with each other in a quartz reactor for synthesizing a metal nanocomposite was defined by synthesis starting time. At this time, a tube, through which a palladium-benzene solution (5 wt % of palladium) is transferred, was wound with a heating line to increase the temperature of the tube to 120° C., thus preventing the palladium precursor from being precipitated during movement and injecting the gasified palladium precursor into the reactor using vapor pressure as soon as the mixed solution reached the reactor. The flow rate of the proportional pump was set 0.05 mL/min. The precursors were transferred by their respective connection tubes, and met with each other at an inlet of a quartz reactor provided in a furnace. In the furnace, the temperature for forming a metal-hybrid nanocomposite, that is, a nickel-palladium nanocomposite, was maintained at 700° C. for 1 hour to prepare a nickel-palladium nanocomposite supported on alumina.

Comparative Example 1

Preparation of Nickel-Palladium Composite Supported on Alumina According to Initial Impregnation Method First, alumina was dried in an oven at 110° C. for 12 hours. Then, the dried alumina was supported with 10 wt % of palladium (Pd), dried in the air for 12 hours, and then further dried in an oven at 110° C. for 12 hours. Subsequently, this alumina was further supported with 5 wt % of nickel (Ni), dried in the air for 12 hours, and then further dried in an oven at 110° C. for 12 hours. Here, palladium nitrate ($Pd(NO_3)_2$) and nickel nitrate ($Ni(NO_3)_2 \cdot 6H_2O$) were used as precursors, and each of the precursors was used while being dissolved in distilled water. Subsequently, the alumina supported with the two kinds of metals (Pd and Ni) was calcined at 450° C. for 4 hours under a nitrogen atmosphere, heated to 800° C. at a heating rate of 10° C./min and then heat-treated for 2 hours to finally prepare a nickel-palladium composite supported on alumina.

Test Example 1

Analysis of X-Ray Diffraction (XRD) Pattern of Nickel-Palladium Nanocomposite

The results of XRD analysis of nickel-palladium nanocomposites prepared in Examples 1 to 3 and Comparative Example 1 are shown in FIG. 1. In FIG. 1, (a) and (b) show the results of XRD analysis of single metal peaks of $Pd/Al_2O_3$ and (b) $Ni/Al_2O_3$, (c) shows the result of XRD analysis of a $Pd-Ni/Al_2O_3$ nanocomposite prepared in Example 1, and (d) shows the result of XRD analysis of a $Pd-Ni/Al_2O_3$ nanocomposite prepared in Comparative Example 1. From FIG. 1, it can be ascertained that the nanocomposite (c) of the present subject matter has nearly the same alloy structure and excellent alloy particle crystallinity compared to those of a nanocomposite used as a conventional alloy catalyst, that is, the composite (d) prepared by the procedures of supporting-drying-calcining-annealing. From the results, it is proved that the method of the present subject matter is a very useful and effective technology for simplifying a conventional alloy catalyst preparation process including several steps into a one-step process.

Test Example 2

Analysis of Amount of Nickel-Palladium Nanocomposite Supported on Alumna According to Synthesis Time In the process of synthesizing a nickel-palladium nanocomposite in the same manner as in Example 1, the amounts of the nickel-palladium nanocomposite supported on the surface of alumina were analyzed using an inductively-coupled plasma optical emission spectrometer (ICP-OES, Perkin-Elmer) when the synthesis time is increased to 5 minutes, 30 minutes, 3 hours and 6 hours. The results thereof are shown in Table 1 below.

TABLE 1

| Synthesis time | 5 minutes | 30 minutes | 3 hours | 6 hours |
|---|---|---|---|---|
| Pd (wt %) | 5 | 7 | 10 | 13 |
| Ni (wt %) | 2 | 4 | 5 | 6 |

From Table 1 above, it can be ascertained that the amount of the metal supported on the surface of alumina increases according to the increase of synthesis time, but the increase rate of the amount thereof somewhat decreases. It is inferred that the reason for this is that, in the early stage, metal particles are easily adsorbed on an alumina support due to the strong interaction between metal particles and the surface of the alumina support, but, with the passage of synthesis time, the amount of metal particles supported on the surface of the alumina support increases, so the surface of the alumina support is covered with metal particles, thereby weakening the interaction between the alumina support and metal particles.

Test Example 3

Figure 2:
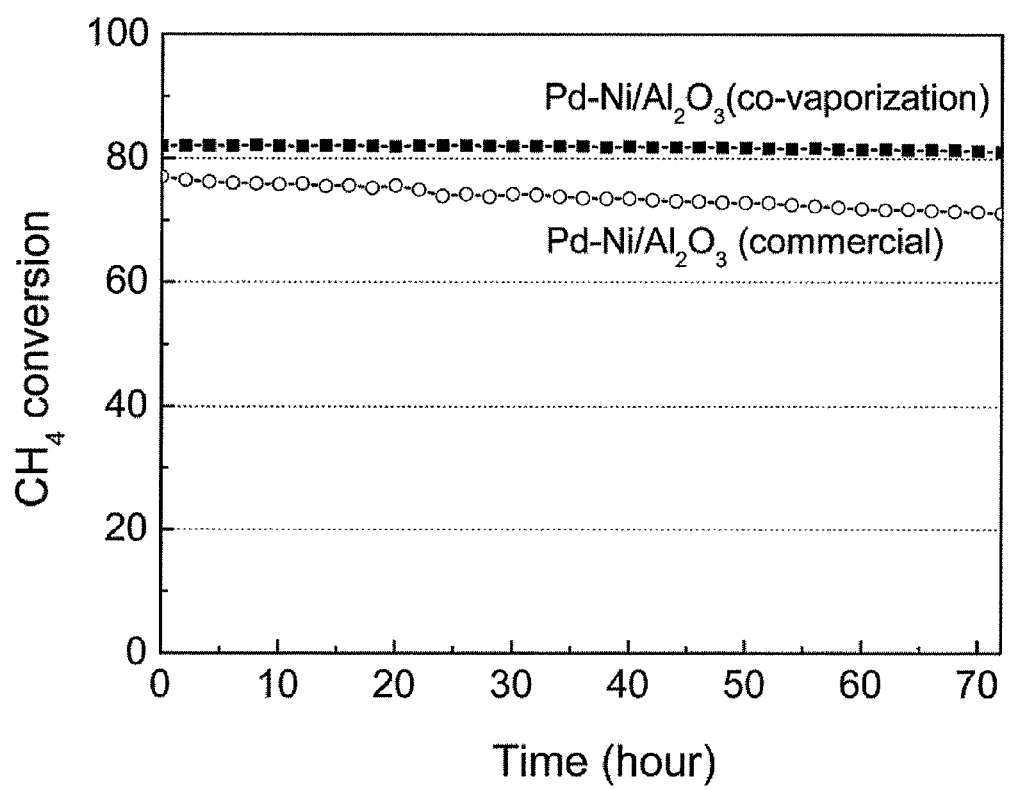
FIG. 2 is a graph showing the conversion ratios of a reactant (methane, $CH_4$) according to the progress of a reaction, wherein test results of performance of a reforming reaction of methane to carbon dioxide using a nickel-palladium nanocomposite prepared in Example 1 and a nickel-palladium nanocomposite prepared in Comparative Example 1 are shown.

Results of Reforming Reaction of Methane to Carbon Dioxide Using Nickel-Palladium Nanocomposite The performance of a reforming reaction of methane to carbon dioxide using the nickel-palladium nanocomposite prepared in Example 1 and the nickel-palladium composite prepare in Comparative Example 1 was tested, and the conversion rates of a reactant (methane, $CH_4$) according to the progress of the reaction are shown in FIG. 2. In order to conduct the reforming reaction, the flow rate of each of reactants (methane and carbon dioxide) was set 30 mL/min, and the reforming reaction was performed in a reactor whose temperature was maintained at 700° C. The reforming reaction is represented by the following Reaction Formula 1:

$$CH_4+CO_2 \rightarrow 2CO+2H_2 \qquad (1)$$

The results of the reforming reaction for 72 hours are shown in FIG. 2. From FIG. 2, it can be ascertained that the initial reaction activity of the $Pd-Ni/Al_2O_3$ composite catalyst prepared in Example 1 is higher by about 8% compared to that of the $Pd-Ni/Al_2O_3$ composite catalyst prepared in Comparative Example 1, and, even after 72 hours, the reaction activity of the $Pd-Ni/Al_2O_3$ composite catalyst prepared in Example 1 is higher by about 10% compared to that of the $Pd-Ni/Al_2O_3$ composite catalyst prepared in Comparative Example 1. Further, from FIG. 1, it was observed that the reaction activity of the catalyst prepared by co-gasification hardly decreased according to the passage of reaction time, whereas the reaction activity of a commercially-available catalyst decreased according to the passage of reaction time. These results are due to the fact that the agglomeration of the catalyst prepared by co-gasification according to the passage of reaction time hardly occurs, and the inactivation of the catalyst according to the formation of coke hardly occurs as well.

As described above, a conventional alloy preparation method requires a complicated process including the steps of calcining, annealing and the like in order to allow precursors to be sequentially supported to finally prepare an alloy, whereas the method of the present subject matter can prepare an alloy in a synthesis procedure without an additional alloying process (calcining or annealing), thus realizing a one-step process.

The multicomponent metal-hybrid nanocomposite according to the present subject matter may be prepared in the form of being supported on various supports such as carbon black, active carbon, carbon nanotubes, alumina, zeolite, silica, titania, zirconia and the like or in the form of powder, so it can be used in various fields. Further, the multicomponent metal-hybrid nanocomposite powder prepared by the method of the present subject matter is characterized in that it is easily adsorbed on the surface of a support by van der Waals' force, so it can be very easily applied onto the inner wall of a channel type catalytic reactor such as a monolithic reactor, a honeycomb reactor, a microchannel reactor or the like, which is a typical catalytic reactor for a heterogeneous reaction. Further, the multicomponent metal-hybrid nanocomposite according to the present subject matter can be practically used in various kinds of membrane materials because it can be applied onto the inner and outer surfaces of various kinds of membrane materials.

Although the preferred embodiments of the present subject matter have been disclosed for illustrative purposes, those skilled in the art will appreciate that various modifications, additions and substitutions are possible, without departing from the scope and spirit of the subject matter as disclosed in the accompanying claims.

What is claimed is:

1. A method of preparing a multicomponent metal-hybrid nanocomposite, comprising the steps of:

(S1) providing a first metal precursor and a second metal precursor which were gasified by their respective gasifiers;

(S2) supplying the gasified first and second metal precursors to a reactor in a noncontact state; and (S3) heating the reactor to a temperature of from about 600 to about 1100° C. and then maintaining the temperature of the reactor constant to synthesize a multicomponent metal-hybrid nanocomposite.

2. The method of claim 1, wherein the first metal precursor and the second metal precursor are different from each other, and are selected from the group consisting of a nickel precursor, a molybdenum precursor, a palladium precursor, a cerium precursor and a tungsten precursor.

3. The method of claim 2, wherein the nickel precursor is nickel(II) acetlyacetonate, bis-cyclopentadienyl nickel or tetrakis-trifluorophosphine nickel.

4. The method of claim 2, wherein the molybdenum precursor is molybdenum hexacarbonyl or molybdenum(V) chloride.

5. The method of claim 2, wherein the palladium precursor is selected from the group consisting of palladium(II) acetate, palladium(II) hexafluoroacetylacetonate, and palladium(II) acetylacetonate.

6. The method of claim 2, wherein the cerium precursor is selected from the group consisting of tetrakis(2,2,6,6-tetramethyl-3,5-heptadionate) cerium(IV), cerium nitrate, cerium dipivaloylmethanate, and cerium (III) chloride.

7. The method of claim 2, wherein the tungsten precursor is tungsten hexacarbonyl or tungsten(IV) chloride.

8. The method of claim 1, wherein, in step S2, the temperature of the reactor is maintained at about the boiling point of each of the first and second metal precursors.

9. The method of claim 1, wherein, in step S2, the gasified first and second metal precursors are supplied to the reactor by a carrier gas, and the carrier gas is oxygen, hydrogen, argon, helium or nitrogen gas.

10. A method of preparing a multicomponent metal-hybrid nanocomposite, comprising the steps of:

(S1) disposing a support in a reactor;

(S2) providing a first metal precursor and a second metal precursor which were gasified by their respective gasifiers;

(S3) supplying the gasified first and second metal precursors to the reactor in a noncontact state; and (S4) heating the reactor to a temperature of from about 600 to about 1100° C. and then maintaining the temperature of the reactor constant to synthesize a multicomponent metal-hybrid nanocomposite supported on the support.

11. The method of claim 10, wherein the support is selected from the group consisting of carbon paper, active carbon, carbon black, alumina powder, an alumina sheet, silica powder, titania powder, zirconia powder, zeolite, nickel foil, and aluminum foil.

12. The method of claim 10, wherein the first metal precursor and the second metal precursor are different from each other, and are selected from the group consisting of a nickel precursor, a molybdenum precursor, a palladium precursor, a cerium precursor and a tungsten precursor.

13. The method of claim 12, wherein the nickel precursor is nickel(II) acetlyacetonate, bis-cyclopentadienyl nickel or tetrakis-trifluorophosphine nickel.

14. The method of claim 12, wherein the molybdenum precursor is molybdenum hexacarbonyl or molybdenum(V) chloride.

15. The method of claim 12, wherein the palladium precursor is selected from the group consisting of palladium(II) acetate, palladium(II) hexafluoroacetylacetonate, and palladium(II) acetylacetonate.

16. The method of claim 12, wherein the cerium precursor is selected from the group consisting of tetrakis(2,2,6,6-tetramethyl-3,5-heptadionate) cerium(IV), cerium nitrate, cerium dipivaloylmethanate, and cerium (III) chloride.

17. The method of claim 12, wherein the tungsten precursor is tungsten hexacarbonyl or tungsten(IV) chloride.

18. The method of claim 10, wherein, in step S3, the temperature of the reactor is maintained at about the boiling point of each of the first and second metal precursors.

19. The method of claim 10, wherein, in step S3, the gasified first and second metal precursors are supplied to the reactor by a carrier gas, and the carrier gas is oxygen, hydrogen, argon, helium or nitrogen gas.

* * * * *